United States Patent [19]

Nakamura

[11] Patent Number: 4,500,395
[45] Date of Patent: Feb. 19, 1985

[54] METHOD OF PRODUCING ELECTRODE FOR LIQUID FUEL CELL

[75] Inventor: Masashi Nakamura, Miura, Japan
[73] Assignee: Nissan Motor Company, Limited, Yokohama, Japan
[21] Appl. No.: 490,955
[22] Filed: May 2, 1983
[30] Foreign Application Priority Data Nov. 5, 1982 [JP] Japan .................. 57-193318

[51] Int. Cl.³ .................. B01J 23/38; B01J 35/02
[52] U.S. Cl. .................. 204/284; 204/290 R; 204/294; 204/30; 429/44; 427/115
[58] Field of Search .......... 204/24, 38 B, 47, 284, 204/290 F, 290 R, 294; 427/115; 252/425.3, 477, 472; 429/44, 45, 40

[56] References Cited

U.S. PATENT DOCUMENTS

| | | | |
|---|---|---|---|
| 3,235,473 | 2/1966 | Le Duc | 204/30 |
| 3,320,093 | 5/1967 | Harding | 136/122 |
| 3,340,097 | 9/1967 | Hess et al. | 136/120 |
| 3,415,734 | 12/1968 | Kalhammer | 204/284 |
| 4,204,918 | 5/1980 | McIntyre et al. | 204/24 |
| 4,309,315 | 1/1982 | Nakamura | 252/472 |

Primary Examiner—Brian E. Hearn
Assistant Examiner—Nathan Thane
Attorney, Agent, or Firm—Schwartz, Jeffery, Schwaab, Mack, Blumenthal & Koch

[57] ABSTRACT

A method of producing an electrode useful as anode of a liquid fuel cell using methanol as fuel. The method has the steps of coating and impregnating a porous electrode body made of carbon with a noble metal such as platinum, activating the noble metal present on and in the electrode body and then depositing a base metal such as tin onto the surfaces of the electrode body coated with the activated noble metal for the purpose of maintaining the activated state of the noble metal coating. To rapidly accomplish the deposition of the base metal while the noble metal remains in the activated state, the method comprises an additional step of immersing the electrode body with the noble metal deposited thereon in a solution containing ions of the base metal precedent to the activation step. For the same purpose, it is very favorable to form through-holes in the electrode body for use in this method.

11 Claims, 9 Drawing Figures

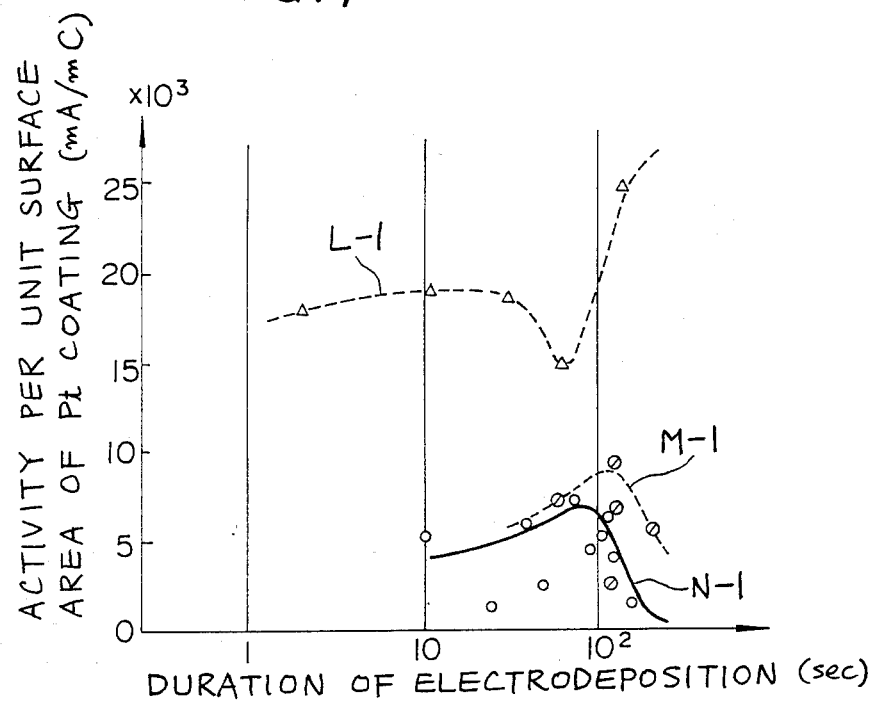
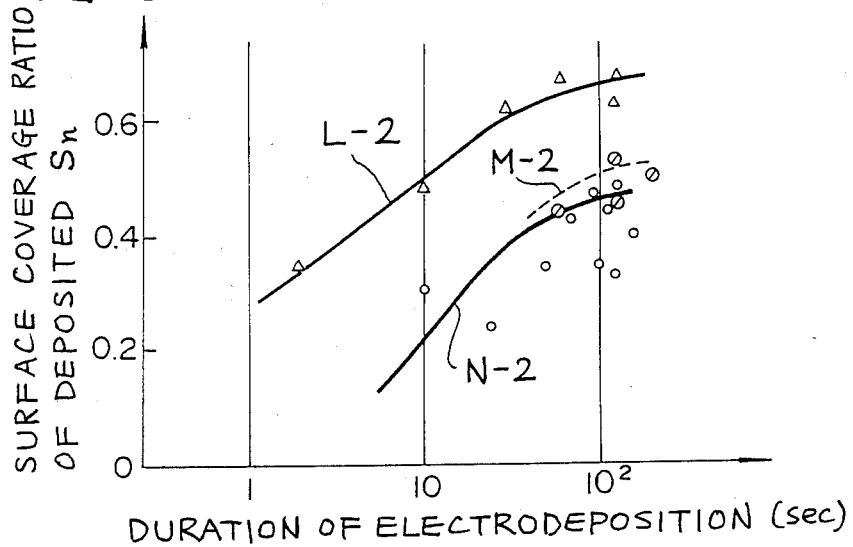

METHOD OF PRODUCING ELECTRODE FOR LIQUID FUEL CELL

BACKGROUND OF THE INVENTION

This invention relates to a liquid fuel cell, and more particularly to a method of producing an electrode useful as the fuel electrode or anode of the fuel cell.

Known fuel cells include liquid fuel cells that utilize an acidic solution as electrolyte and an organic liquid compound such as methanol or formic acid as fuel. It is conventional to use a noble metal such as platinum as the electrode material for the anode of a liquid fuel cell of this type.

Concerning a fuel cell electrode formed of a plate of platinum or an alternative noble metal, U.S. Pat. No. 4,309,315 shows a method of activating the surfaces of the platinum plate and maintaining the activated state. In this method, the activation is accomplished by a known technique such as an electrochemical oxidation and reduction process which has the effect of changing the arrangement of platinum atoms in a surface region of the electrode plate to a partially dislocated and unstable state. The platinum surface exhibits a high activity so long as it remains in such an unstable state. Following the activating process, a relatively small amount of another metal such as tin is deposited on the activated platinum plate, by electrodeposition for example, in order that a portion of the newly deposited base metal may intrude into the vacancies in the atom arrangement of platinum in the unstable and activated state. The base metal such as tin deposited in such a manner serves the purpose of maintaining the platinum surface in the activated state. As will be understood, it is a requirement that the deposition of a base metal such as tin be accomplished in a short time before the platinum surface reverts to the stable state. This requirement can be met because the electrode body is a solid metal plate having smooth surfaces and, hence, the solution containing tin ions used in the electrodeposition process can rapidly diffuse onto the entire area of the electrode surfaces.

From an economical point of view, it is unfavorable to use an expensive noble metal as the structural material of the electrode. Accordingly, a different type of electrodes for liquid fuel cells are under development based on the thought of using a porous body of an inexpensive and electrically conductive material such as carbon and coating and impregnating the porous body with a small amount of noble metal such as platinum. However, in the production of an electrode of this type it is difficult to effectively utilize the technique of the above quoted U.S. patent to maintain platinum on the electrode body in a highly activated state. The reason is that at the electrodeposition of a base metal such as tin, the solution containing the metal ions does not easily arrive at the platinum surfaces in the micropores in the electrode body and, therefore, a desired manner of deposition of the metal such as tin on the platinum surfaces can hardly be accomplished within a short time during which the platinum surfaces remain in the activated state.

SUMMARY OF THE INVENTION

The present invention is concerned with the production of an electrode for a liquid fuel cell, the electrode being of the type fundamentally constructed by coating and impregnating a microscopically porous body of carbon with a noble metal, and an object of the invention is to provide an improved method of producing such an electrode with no difficulty in maintaining the noble metal on the electrode body in a highly activated state.

A method according to the invention comprises the steps of (a) depositing a noble metal onto a porous electrode body which is made essentially of carbon such that the electrode body is coated and impregnated with the noble metal, (b) immersing the electrode body coated and impregnated with the noble metal in a solution containing ions of a base metal for a period of time sufficient for diffusion of the solution into the pores in the electrode body, (c) after step (b) activating the noble metal deposited on the electrode body by changing the arrangement of the atoms of the noble metal on the surfaces of the electrode body to an unstable state, and (d) depositing the aforementioned base metal onto the surfaces of the electrode body already coated with the noble metal while the noble metal remains in the activated state.

The primary feature of this method resides in the treatment of the electrode body at the step (b). By the immersion of the electrode body after deposition of the noble metal in a solution containing the ions of the base metal to be subsequently deposited on the electrode body, a sufficient amount of the metal ions are supplied into the pores in the electrode body in advance of the activation of the initially deposited noble metal and the deposition of the base metal. Therefore, at the subsequent step (d) a sufficient amount of the base metal can be deposited in a very short time not only on the outer surfaces of the electrode body but also in the micropores in the electrode body.

In this method it is suitable to perform the activation step (c) by an electrochemical treatment and the deposition step (d) by electrodeposition. In that case the steps (b), (c) and (d) can be performed continuously be preparing the solution for use in the step (b) as an acidic aqueous solution to use it as an electrolyte solution throughout the subsequent steps (c) and (d).

Furthermore, the applicant has discovered that the effect of the treatment at the step (b) can further be augmented by forming a plurality of through-holes in the electrode body prior to the deposition of the noble metal at the step (a). When using an electrode body formed with through-holes, it is preferred to keep one end of every through-hole closed by using a removable covering until completion of the deposition of the noble metal on the electrode body.

Platinum is a typical and preferred example of the noble metal for use in the present invention, but other metals of the platinum group and various alloys of metals of the platinum group are also of use. Tin is a preferred example of the base metal for use in this invention. Lead and titanium are named in the second place, and it is also possible to use a still different metal such as cadmium or arsenic.

The method of the invention is suited to industrial applications, and by this method it is possible to produce inexpensive electrodes for liquid fuel cells with enhanced activity per unit area of the outer surfaces of the individual electrodes.

BRIEF DESCRIPTION OF THE DRAWINGS

FIG. 7 is a graph showing the dependence of the activity of an electrode produced by a method according to the invention, per unit area of its platinum coating, on the duration of an electrodeposition process to deposit tin on the platinum coating examined with respect to samples produced in examples of the invention;

FIG. 8 is a graph showing the dependence of the surface coverage ratio of the deposited tin on the duration of the electrodeposition process examined with respect to the aforementioned samples.

DESCRIPTION OF THE PREFERRED EMBODIMENTS

Figure 1:
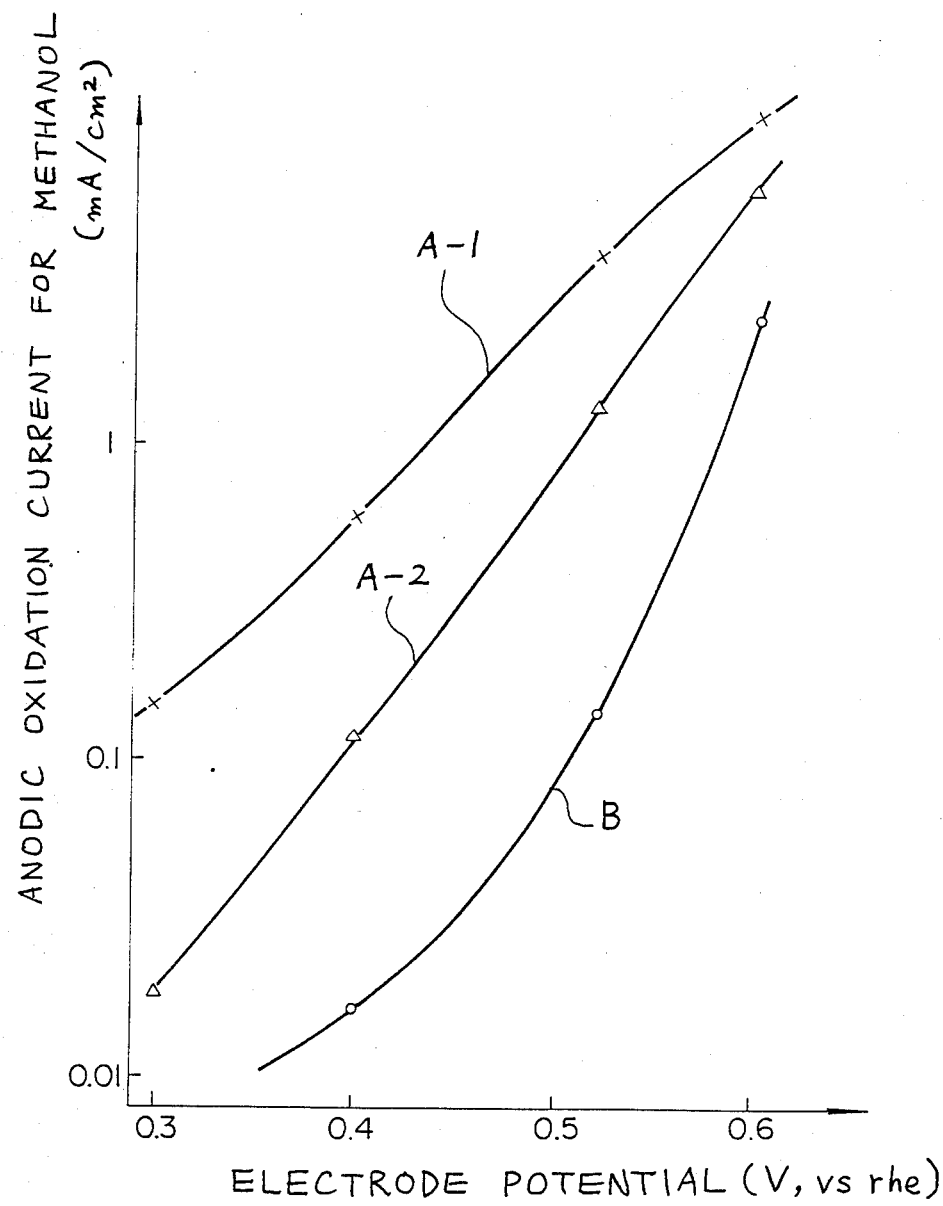
FIG. 1 is a graph showing the activity, represented by anodic oxidation current for methanol, for electrodes produced in an example of the invention in comparison with a resembling electrode produced by a method not in accordance with the invention.

The body of an electrode to be produced by the method of the invention is a microscopically porous body of which the principal material is carbon. In industrial practice it is favorable to use a sintered or calcined body of carbon or graphite, or a mixture thereof, in view of suitableness in physical and chemical properties, ease of production and lowness of cost.

It is preferred to use an electrode body having a porosity of 30 to 60%. When the porosity is too low it is difficult to well impregnate the electrode body with a noble metal such as platinum, but when the porosity is too high the electrode body becomes low in mechanical strength. As to the pore size in the electrode body, it is preferred that the mean diameter of the pores is smaller than about 50 μm. When the pore size on the average is too large the electrode body is liable to become insufficient in the effective surface area of deposition of platinum or an alternative noble metal, and an electrode produced by using such an electrode body might remain insufficient in its efficiency. Besides, when a number of through-holes are formed in such an electrode body there arises a possibility of lowering in the mechanical strength of the electrode body. When the pore size on the average is too small it becomes difficult to have platinum or an alternative metal permeate deep into the pores, and therefore an effective surface area of the deposited metal becomes relatively small. Therefore, it is preferred that the mean diameter of the pores in the electrode body is larger than about 1 μm.

As mentioned hereinbefore, it is very favorable to form through-holes in the porous electrode body in advance of the initial treatment of the electrode body for the deposition of platinum or an alternative metal. In utilizing this novel technique, it is suitable that the size of each through-hole represented by diameter is in the range from 0.1 to 1.5 mm because the formation of larger holes will result in a decrease in the effective surface area for the deposition of platinum and also in lowering of the mechanical strength of the electrode body, whereas very small through-holes are difficult to form in practice and in some cases will be insufficient in their effects. Also it is suitable to form 10 to 30 through-holes per 1 $cm^2$ of the electrode body surface on which the through-holes open.

As the noble metal to be deposited on the electrode body, platinum is the most popular and preferred also in the present invention. However, it is also possible to alternatively use a different metal of the platinum group or an alloy of metals of the platinum group. As to the method for the deposition of such a noble metal, it it preferable to use a wet process in which the porous electrode body is first immersed in an aqueous solution of a suitable compound of the selected metal, such as chloroplatinic acid. The electrode body impregnated with the metal compound solution is dried and subjected to a suitable reduction treatment to reduce the metal adhering to the electrode body to elemental form. When the electrode body is formed with through-holes it is desirable to keep one end of every through-hole closed, by using a seal tape for example, during the immersion and drying operations because it has the effect of facilitating diffusion of the solution deep into the micropores in the electrode body.

Next, the electrode body coated and impregnated with platinum, for example, is immersed in a solution containing ions of a base metal such as tin which is selected for use in a subsequent treatment to maintain the precedingly deposited platinum in activated state. The electrode body is kept immersed in the solution for a while in order to allow the ions of the base metal to sufficiently permeate into the micropores in the electrode body. A suitable range of the concentration of the metal ions in the solution is from $10^{-2}$ to $10^2$ g/l. In the case of tin ions, the most suitable range of the concentration is from 0.1 to 1 g/l. Usually it suffices to keep the electrode body immersed in the solution for at least 5 min.

Successively to this treatment, activation of platinum on the electrode body is performed by a known electrochemical treatment. Preferably the solution containing tin ions used in the preceding treatment is an acidic solution which serves as an electrolyte solution because then the activating treatment can be performed continuously with the preceding treatment.

The activating treatment is immediately followed by a process to deposit, for example, tin atoms on the activated platinum coating on the electrode body. It is most suitable to employ an electrodeposition process, though it is also possible to employ a different method such as sputtering or ion inplantation. The electrodeposition process also can be carried out by using the aforementioned acidic solution containing tin ions. As the effect of this process, the deposited tin atoms occupy the vacancies in the arrangement of the precedingly deposited platinum atoms resulting from dislocation of some platinum atoms during the activating treatment. Therefore, the electrodeposited tin serves the purpose of maintaining the platinum coating in highly activated state. As mentioned hereinbefore, the efficiency of the electrodeposition process is greatly enhanced by the immersion of the electrode body in a solution containing tin ions (i.e. ions of the metal to be subsequently deposited) precedent to the activating treatment.

EXAMPLE 1

Use was made of an electrode body in the form of a microscopically porous plate, which was obtained by sintering of carbon black with the addition of small amounts of usual auxiliary materials and had a porosity of 40%.

The porous carbon plate was first kept immersed for 1 hr in an aqueous solution of chloroplatinic acid in which the concentration of platinum was 40 g/l. The solution was kept heated at 80° C. Next the wet carbon plate was immersed for 3 min in 10% aqueous solution of potassium hydroxide to thereby fix platinum in the form of potassium salt on the porous carbon plate, and thereafter the carbon plate was dried in air at 80° C. for 1 hr. The dried carbon plate was kept immersed for 30 min in 100% hydrazine hydrate kept at 25° C. to thereby reduce the platinum salt on the plate to metallic platinum. The carbon plate thus coated and impregnated with platinum was washed with water to completely remove hydrazine.

An acidic aqueous solution containing 0.56 g/l of $Sn^{4+}$ ions was prepared by dissolving tin tetrachloride $SnCl_4.5H_2O$ in 2N sulfuric acid solution. Maintaining this solution at 25° C., the carbon plate already coated and impregnated with platinum was kept in the solution for 35 min in order to allow $Sn^{4+}$ ions in the solution to sufficiently diffuse into the micropores in the plate. Thereafter an activating treatment was made in the following manner for the purpose of highly activating platinum deposited on the carbon electrode plate immersed in the acidic solution. First the potential of the electrode plate versus the reversible hydrogen electrode (rhe) potential was maintained at 1.7-1.8 V for about 5-10 sec to thereby oxidize the surfaces of platinum on the electrode plate. Then the potential of the electrode plate was lowered at a rate of 1 V/sec to −0.08 V to thereby reduce and remove the oxide present on the platinum surfaces and to consequently bring platinum remaining on the electrode plate to an unstable and highly active state. Successively, the potential of the electrode plate was maintained at −0.08 V for 260 sec to achieve electrodeposition of a sufficient amount of tin ions contained in the solution onto the platinum coating on the electrode plate while the platinum remained in the unstable and highly active state.

To examine the activity or efficiency of the electrode plate produced by the above described process in a liquid fuel cell using methanol, the relationship between the electrode potential (vs rhe potential) and the anodic oxidation current for methanol was measured at 25° C. in 2N sulfuric acid solution containing 1.3 mole/l of methanol. In FIG. 1, the curve A-1 represents the result of this evaluation test. The curve A-2 represents the result of the same test on another electrode plate which was produced by repeating the process of Example 1 almost similarly but by shortening the duration of the immersion of the electrode plate in the tin chloride solution before the activating treatment to only 20 sec. Though the electrodeposition of tin was carried out for 260 sec also in this case, the amount of the deposited tin expressed by the surface coverage ratio was 18%. This means that the shortening of the immersion time resulted in a considerable lowering in the rate of electrodeposition of tin. By further experiment, however, it was confirmed that the characteristic curve A-1 remains almost unchanged so long as the duration of the immersion of the electrode plate in the tin chloride solution is longer than about 5 min.

For comparison, the curve B in FIG. 1 shows the result of the same evaluation test on an analogous electrode plate produced generally in accordance with Example 1 except that the activating treatment was performed without preceded by immersion of the electrode plate in the tin chloride solution.

EXAMPLE 2

Figure 2:
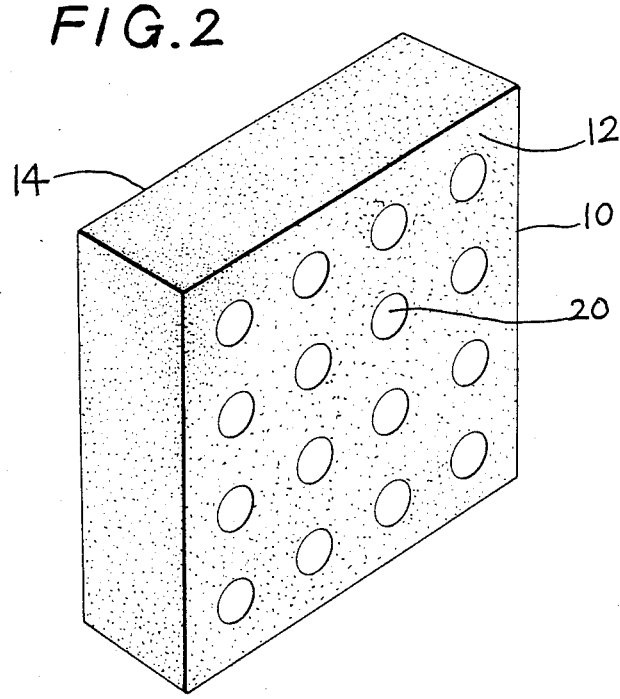
FIG. 2 is a schematic perspective view of a carbon electrode body formed with through-holes and used in an example of the invention.

Use was made of an electrode body in the form of a microscopically porous plate, which was obtained by sintering of carbon black with the addition of small amounts of usual auxiliary materials. The porosity of this carbon plate was 35%, and the mean diameter of the pores in the plate was about 10 μm. The plate was 10 mm × 10 mm wide and 5 mm thick. Referring to FIG. 2, sixteen through-holes 20 were formed by drilling in the porous carbon plate 10 in the arrangement as illustrated so as to all open at the front and back surfaces 12 and 14 of the plate 10. These through-holes 20 were all about 1 mm in diameter. After drilling the perforated plate 10 was well washed in an ultrasonic cleaner to completely remove chips and then dried for 1 hr in an oven maintained at 80°-100° C.

Figure 3:
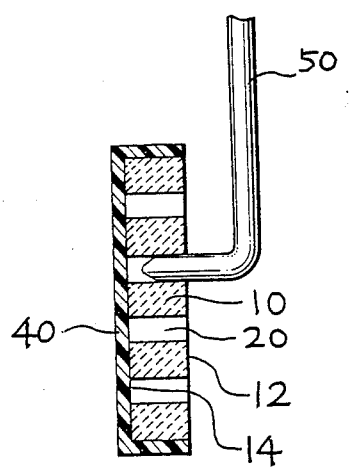
FIG. 3 is a schematic sectional view of the electrode body of FIG. 2 with a seal tape applied thereto preparatory to the deposition of platinum thereon.

Referring to FIG. 3, a seal tape 40 made of a plastic material high in resistance to chemicals was applied to the carbon plate 10 so as to completely cover its back surface 14. The purpose of the seal tape 40 will be explained hereinafter. From the front side a lead wire 50 for collection or current was tightly inserted into one of the through-holes 20. The lead wire 50 was of a corrosion resistant metal such as titanium or tantalum.

Figure 4:
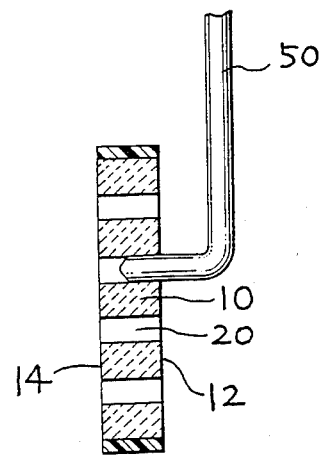
FIG. 4 shows the electrode body of FIG. 3 in the same view but in a state after removal of the seal tape in advance of activation of the deposited platinum.
Figure 5:
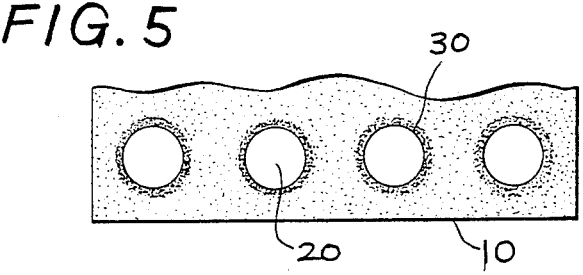
FIG. 5 is a fragmentarily enlarged plan view of the electrode body in FIG. 4.
Figure 6:
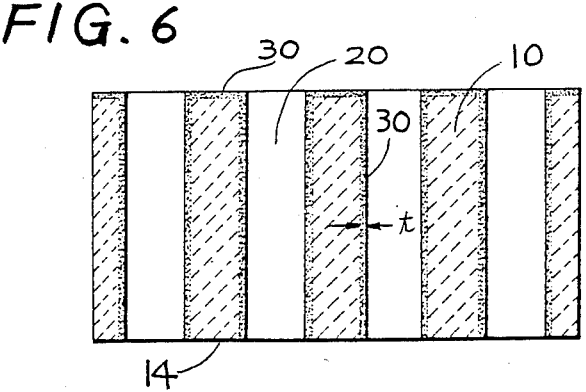
FIG. 6 is a fragmentarily enlarged sectional view of the electrode body in FIG. 4.

The carbon plate 20 in the state of FIG. 3 was kept immersed for 1 hr in 10% (by weight) solution of chloroplatinic acid kept heated at 80° C. to allow the solution permeate deep into the micropores in the plate 10. Then the wet plate 10 was dried in air at about 80° C. for 1 hr, and the dried plate 10 was immersed in 100% hydrazine hydrate kept at 25° C. to thereby reduce the platinum salt adhering to the carbon plate 10 to metallic platinum. After that, as shown in FIG. 4, the seal tape 40 was removed from the back surface 14 of the carbon plate 10 so that the through-holes 20 restored themselves. As illustrated in FIGS. 5 and 6, the foregoing treatments resulted in that not only the front surface of the carbon plate 10 but also the cylindrical inner surfaces provided by the boring of the through-holes 20 were covered with a platinum coating layer 30, though the back surface 14 remained uncoated due to the existence of the seal tape 40 thereon during the treatments.

In the above described process for coating and impregnating the porous carbon plate 10 with platinum, the effect of the seal tape 40 is explained as follows. At the drying step prior to the reduction step, air present in the micropores in the plate 10 is forced to expand and diffuse out toward the uncovered front surface 12 of the plate 10. Such one-way movement of air in the still wet plate 10 causes some portions of chloroplatinic acid dissolved and absorbed in the porous plate 10 to move toward the surfaces of the plate 10 before precipitation thereof, and therefore the control of the thickness t of the platinum coating can be facilitated.

Next, the plate 10 already coated and impregnated with platinum was immersed for 1 hr in the tin tetrachloride solution ($Sn^{4+}$ concentration 0.56 g/l) used in Example 1, while the temperature of the solution was maintained at 40° C. in this case, to allow the solution to diffuse deep into the micropores in the plate 10.

After that, the activating treatment and the succeeding electrodeposition process described in Example 1 were carried out identically to thereby deposit a sufficient amount of tin on the platinum coating on the carbon plate while the platinum remained in an unstable and highly activated state.

EXAMPLE 3

Using the porous carbon plate 10 formed with the through-holes 20, an electrode plate was produced by performing the entire process of Example 2 in the same way except that the seal tape 40 was left adhered to the back surface 14 of the plate 10 until completion of the activation of the deposited platinum and electrodeposition of tin.

EXAMPLE 4

An electrode plate was produced by performing the process of Example 2 generally similarly but in this case by using the porous carbon plate without forming the through-holes 20 therein. Accordingly the seal tape 40 was not used in this example.

With respect to the three kinds of electrodes produced in Examples 2, 3 and 4, FIG. 7 shows the electrochemical oxidation activity of each electrode for methanol as a function of the duration of the electrodeposition process for the deposition of tin. The curves L-1, M-1 and N-1 represent the electrodes of Examples 2, 3 and 4, respectively. In the test for evaluation of the electrochemical oxidation activity, the electrolyte was a 2N sulfuric acid solution kept at 25° C. in which the concentration of methanocal was 1.3 mole/l, and the electrode potential (vs rhe potential) was 0.4 V. The activity is expressed as methanol oxidation current per unit area of the platinum coating. As can be seen in FIG. 7, the activity of the electrode produced in Example 2 wherein the through-holes 20 in the carbon plate 10 were effectively utilized during the electrodeposition of tin was three to four times higher than the activities of the electrodes of Examples 3 and 4.

As a supplementary experiment, the duration of the electrodeposition operation in Examples 2 to 4 was varied to examine the relationship between the duration of the operation and the amount of deposited tin expressed as the surface coverage ratio of tin, which was determined from an effective surface area for adsorption of hydrogen atoms based on the principle that tin deposited on the platinum coating does not adsorb hydrogen atoms. The result is shown in FIG. 8, wherein the curves L-2, M-2 and N-2 represent Examples 2, 3 and 4, respectively. As can be seen in FIG. 8, the rate of electrodeposition of tin onto the platinum-coated electrode plate in Example 2 wherein the through-holes 20 in the plate were effectively utilized was about 10 times higher than the electrodeposition rates in Examples 3 and 4. This means that in Example 2 the fixing of the unstable and active state of platinum deposited on the carbon plate was accomplished very rapidly, and it explains the primary reason for very high activity of the electrode produced in Example 2.

The through-holes in the electrode body contribute to such enhancement of the activity of the obtained electrode probably for the following reasons. It is a fact that at the stage of electrodeposition of tin after activation of precedingly deposited platinum a considerable quantity of hydrogen gas is liberated within the porous electrode. When the electrode is not formed with through-holes the micropores in the electrode are soon shielded by hydrogen gas, so that the diffusion of the electrolyte solution containing tin ions into the micropores is obstructed to result in considerable lowering in the rate of deposition of tin. The through-holes formed in the electrode allow the liberated hydrogen gas to smoothly flow out of the electrode and, hence, facilitate diffusion of the electrolyte solution into the micropores in the electrode so that the distances travelled by the tin ions under electrodeposition become very short. Consequently the electrodeposition of a sufficient amount of tin can be achieved in a very short time with success in maintaining the precedingly deposited platinum in a highly activated state.

Also in the use of the produced electrode in a liquid fuel cell, the existence of the through-holes affords an advantage to the electrode. That is, carbon monoxide gas formed by the electrode reaction smoothly flows out of the electrode so that a decrease in the effective surface area of the electrode by reason of accumulation of the gas becomes insignificant. Accordingly the durability of the electrode is improved.

EXPERIMENT

Several kinds of sintered porous carbon plates different in mean diameter of the micropores were used as electrode body materials. For each kind of carbon plate, some samples were formed with through-holes having a diameter of 1 mm at the distribution of 10 holes per 1 $cm^2$ while some samples were used without forming through-holes. In other respects, the production of electrodes was performed in accordance with Example 2.

Figure 9:
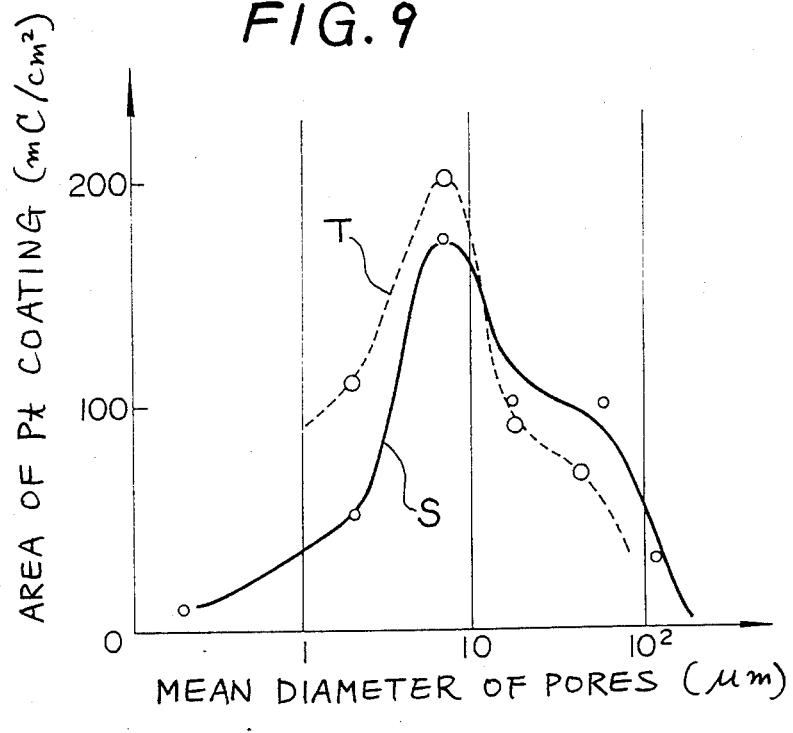
FIG. 9 is a graph showing the influence of the through-holes in the electrode body on the relationship between the mean diameter of the pores in the electrode body and the surface area of the platinum coating on the electrode body.

FIG. 9 shows the relationship betwee the mean diameter of the pores in the electrode body and the effective surface area of the platinum coating on each of the electrodes produced in this experiment. The curve S represents the electrodes having no through-holes and the curve T the electrodes formed with the aforementioned through-holes. From a comparison between the curves S and T, it is understood that the effect of the through-holes is significant when the mean pore size of the electrode body is smaller than about 10 $\mu$m. That is, as illustrated in FIGS. 5 and 6, the formation of the through-holes in the electrode body results in enlargement of the effective surface area of the platinum coating layer having a suitable thickness t though the electrode body is relatively small in pore size. Accordingly, the formation of the through-holes makes it possible to utilize porous electrode bodies that are relatively dense (low in porosity) and high in mechanical strength but hitherto have been regarded as impracticable. When the mean pore diameter was larger than about 10 $\mu$m the effect of the through-holes on the effective surface area of the platinum coating was negative in this experiment. However, even for such electrode bodies the formation of through-holes becomes effective by suitably decreasing the diameter of each through-hole.

What is claimed is:

1. A method of producing an electrode for a liquid fuel cell, comprising the steps of:
   (a) depositing a noble metal onto a porous electrode body comprising carbon to coat and impregnate said electrode body with said noble metal;
   (b) immersing said electrode body coated and impregnated with said noble metal in a solution containing ions of a base metal for at least 5 minutes to sufficiently diffuse said solution into the pores in said electrode body;

(c) after step (b) activating said noble metal deposited on said electrode body by changing the arrangement of the atoms of said noble metal on the surface of said electrode body to an unstable state; and (d) thereafter depositing said base metal onto the surface of said electrode body already coated with said noble metal while said noble metal remains in the activated state.

2. A method according to claim 1, wherein said noble metal is selected from the group consisting of metals of the platinum group and alloys thereof.

3. A method according to claim 2, wherein said base metal is selected from the group consisting of tin, lead and titanium.

4. A method according to claim 3, wherein the concentration of the ions of said base metal in said solution is in the range from $10^{-2}$ to $10^2$ g/l.

5. A method according to claim 1, wherein the activation of said noble metal at step (c) is performed by an electrochemical treatment and the deposition of said base metal at step (d) is performed by electrodeposition.

6. A method according to claim 5, wherein said solution in step (b) is an acidic aqueous solution and said solution is used as an electrolyte solution at steps (c) and (d).

7. A method according to claim 1, wherein the porosity of said electrode body is in the range from about 30% to about 60%.

8. A method according to claim 7, wherein the pores in said electrode body are smaller than about 50 μm in mean diameter.

9. A method according to claim 1, wherein said electrode body for use in the method is formed with a plurality of through-holes having a diameter in the range from about 0.1 to 1.5 mm.

10. A method according to claim 9, wherein the number of said through-holes is in the range from 10 to 30 per 1 cm² of the electrode body surface on which said through-holes open.

11. A method according to claim 9, wherein one end of each of said through-holes is kept closed by a removable covering until completion of step (a).

* * * * *